(No Model.) 2 Sheets—Sheet 1.
G. SKINNER.
AWNING FRAME.
No. 593,729. Patented Nov. 16, 1897.
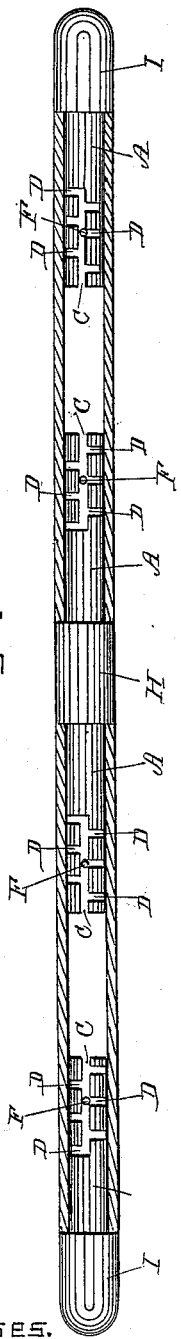
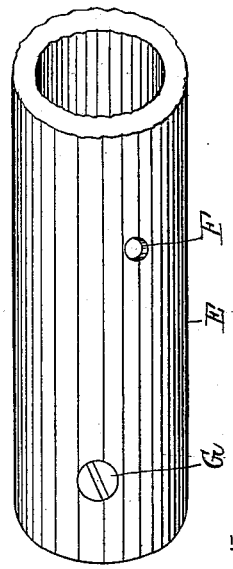
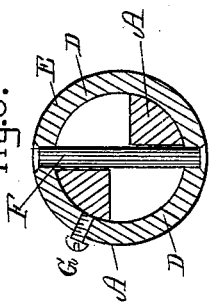
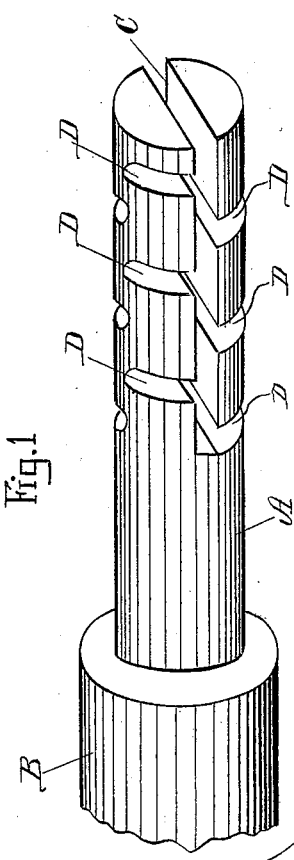
Witnesses.
Lauritz N. Möller
Henry R. Page
Inventor.
George Skinner
by his atty.

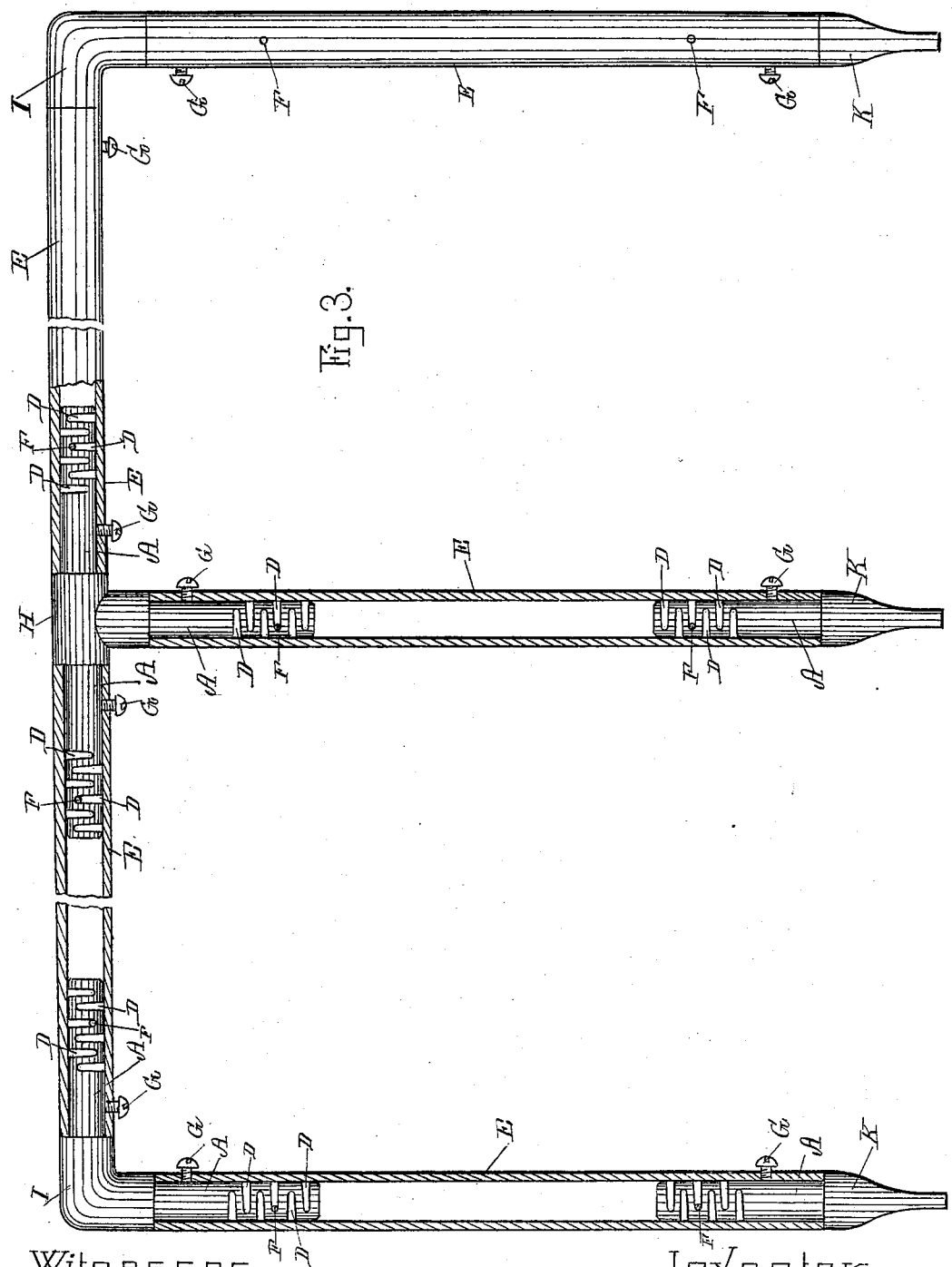

UNITED STATES PATENT OFFICE.

GEORGE SKINNER, OF CAMBRIDGE, MASSACHUSETTS.

AWNING-FRAME.

SPECIFICATION forming part of Letters Patent No. 593,729, dated November 16, 1897.

Application filed February 2, 1897. Serial No. 621,671. (No model.)

*To all whom it may concern:*

Be it known that I, GEORGE SKINNER, a citizen of the United States, and a resident of Cambridge, in the county of Middlesex and State of Massachusetts, have invented new and useful Improvements in Awning-Frames, of which the following, taken in connection with the accompanying drawings, is a specification.

This invention relates to improvements in awning-frames which are composed of gas-pipes; and the object of the invention is, first, to provide a portable frame composed of gas-pipes and adjustable corner, center, and end pieces, as occasion may require; second, to pack the parts for storing and transportation in a very small space, and, third, to make the parts readily adjustable, safe, and easy to handle.

Heretofore awning-frames have been made of solid wrought-iron rods, either alone or by welding the same onto gas-pipes, or such rods and gas-pipes have been fastened together by a screw-bolt projecting over the corner or by ordinary gas-pipe corner-pieces, neither of which constructions have proven satisfactory, as they take up a great deal of space and are difficult to handle.

The invention, although particularly designed for awning-frames, is equally well adapted for railings, banisters, &c., or as adjustable joints for other purposes to which it is applicable.

My invention is carried out as follows, reference being had to the accompanying drawings, wherein—

Figure 1 represents a perspective view of the male portion of the adjustable joint. Fig. 2 represents a perspective view of the female or pipe portion of said joint. Fig. 3 represents a top plan view, partly shown in section, showing my improved adjustable joint as applied to an awning-frame. Fig. 4 represents an end view of Fig. 3, partly shown in section; and Fig. 5 represents a cross-section of the improved joint.

Similar letters refer to similar parts wherever they occur on the different parts of the drawings.

The improved adjustable joint is composed of a cylindrical solid metal shank A, preferably provided with a shoulder or enlargement B a proper distance from its end, as shown in Fig. 1. The shank A is provided with a central longitudinal slit or groove C, communicating with a series of lateral slots or grooves D D, as shown in said Fig. 1. In connection with said slotted shank I use a metal pipe E, adapted to fit around the shank A, and through such pipe or tube is inserted a pin F. (Shown in Figs. 2 and 5.)

In putting the parts together the shank A is inserted into the pipe E in such a manner that the longitudinal slot C in the shank A receives the pin F, and when inserted the proper distance the pipe E is turned around the shank A about a fourth of a revolution, causing the pin F to interlock with either one of the lateral grooves D, thus holding the parts firmly secured together.

If so desired, the pipe E may be further secured to the shank A by means of a set-screw G, as shown in Figs. 2 and 3, or by a pin inserted through any one of the slots or grooves D D.

In Figs. 3 and 4 I have shown my improved adjustable joint as applied to an awning-frame, on which H is the center T-headed piece, I I are the corner-pieces, and K K K are the pivoted end pieces.

The invention, as before stated, is, however, equally well adapted for rail or banister joints or for other purposes where it is desired to make connections between pipes.

What I wish to secure by Letters Patent and claim is—

The herein-described adjustable joint or pipe connection consisting in combination a cylindrical shank A having a bifurcated end provided with a longitudinal slit C and one or more lateral recesses D D in the bifurcated portion and an external tube E adapted to fit and inclose the shank A and its bifurcated end, and a transverse pin F secured to the tube E and adapted to be introduced in the slit C and to be locked in the lateral recesses D, D, substantially as and for the purpose set forth.

In testimony whereof I have signed my name to this specification, in the presence of two subscribing witnesses, on this 27th day of January, A. D. 1897.

GEORGE SKINNER.

Witnesses:
ALBAN ANDRÉN,
LAURITZ N. MÖLLER.